United States Patent
Tallapaneni et al.

(10) Patent No.: US 9,402,110 B2
(45) Date of Patent: Jul. 26, 2016

(54) NON-INTRUSIVE ADVERTISEMENT PRESENTATION METHODS AND SYSTEMS

(75) Inventors: Kishore Tallapaneni, Flower Mound, TX (US); Brian F. Roberts, Dallas, TX (US); Anthony M. Lemus, Irving, TX (US); Japan A. Mehta, Coppell, TX (US); Donald H. Relyea, Dallas, TX (US); Michael R. Oliver, Hoboken, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 307 days.

(21) Appl. No.: 13/179,384

(22) Filed: Jul. 8, 2011

(65) Prior Publication Data

US 2013/0014151 A1  Jan. 10, 2013

(51) Int. Cl.
*H04N 7/10* (2006.01)
*H04N 7/025* (2006.01)
*H04N 21/81* (2011.01)
*H04N 21/258* (2011.01)
*H04N 21/442* (2011.01)
*H04N 21/4784* (2011.01)
*G06Q 30/02* (2012.01)

(52) U.S. Cl.
CPC ......... *H04N 21/812* (2013.01); *G06Q 30/0241* (2013.01); *H04N 21/25891* (2013.01); *H04N 21/44204* (2013.01); *H04N 21/4784* (2013.01)

(58) Field of Classification Search
None
See application file for complete search history.

(56) References Cited

U.S. PATENT DOCUMENTS

| | | | |
|---|---|---|---|
| 5,027,400 A * | 6/1991 | Baji et al. | 725/116 |
| 7,934,230 B2 * | 4/2011 | Badt et al. | 725/32 |
| 2003/0115596 A1 * | 6/2003 | Okajima et al. | 725/34 |
| 2003/0226142 A1 * | 12/2003 | Rand | 725/32 |
| 2008/0155589 A1 * | 6/2008 | McKinnon | G06Q 30/02 725/34 |
| 2009/0210899 A1 * | 8/2009 | Lawrence-Apfelbaum et al. | 725/34 |
| 2009/0288129 A1 * | 11/2009 | Wolfe | H04N 21/234309 725/116 |
| 2010/0325413 A1 * | 12/2010 | Chandramouli | H04N 21/235 713/150 |
| 2011/0265117 A1 * | 10/2011 | Cha et al. | 725/35 |

* cited by examiner

*Primary Examiner* — Nasser Goodarzi
*Assistant Examiner* — Fred Peng

(57) ABSTRACT

An exemplary method includes a non-intrusive advertisement presentation system subscribing a user to an advertisement service associated with a media content program, detecting a presentation of the media content program together with one or more advertisements associated with the media content program, and providing, in accordance with the advertisement service and in a manner independent of the presentation of the media content program together with the one or more advertisements, advertisement content associated with the one or more advertisements for selective access by the user. Corresponding methods and systems are also disclosed.

23 Claims, 9 Drawing Sheets

NON-INTRUSIVE ADVERTISEMENT PRESENTATION METHODS AND SYSTEMS

BACKGROUND INFORMATION

Set-top box devices and other access devices are often configured to provide users with access to a large number and variety of media content choices. For example, a user may choose to experience a variety of broadcast television programs, pay-per-view services, video-on-demand programming, Internet services, and audio programming via a set-top box device.

Many access devices include a digital video recording ("DVR") application that allows a user to view or otherwise experience media content in one or more "trick play" modes. For example, a user may pause a presentation of a media content program (e.g., a broadcast television program), skip to a different position within a media content program, fast forward within a media content program, and/or rewind within a media content program.

DVR technology has had a significant impact on the advertising industry. In the past, the basic business model for broadcast television programming has been free or low cost distribution of media content, subsidized by the insertion of advertisements within a media content stream. However, DVR applications allow users to easily skip these advertisements. Hence, alternative approaches to distributing advertisements to DVR users and other users who ignore advertisements presented in conjunction with a media content program are desirable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
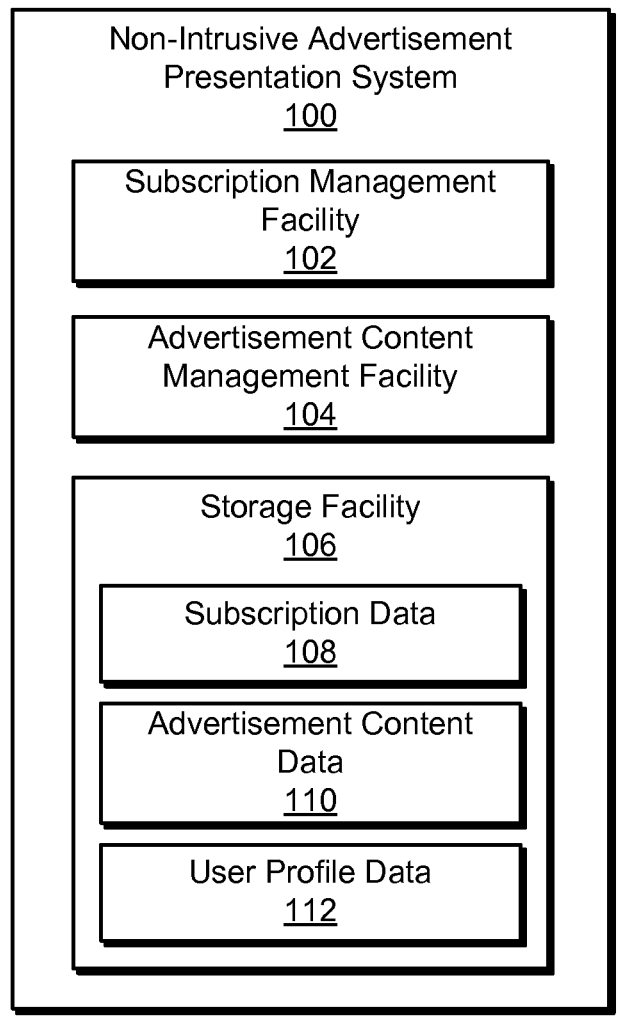
FIG. 1 illustrates an exemplary non-intrusive advertisement presentation system according to principles described herein.

Non-intrusive advertisement presentation methods and systems are described herein. As will be described in more detail below, a non-intrusive advertisement presentation system may subscribe a user to an advertisement service associated with a media content program (e.g., in response to a request by the user), detect a presentation (e.g., a broadcast) of the media content program together with one or more advertisements associated with the media content program, and provide, in accordance with the advertisement service and in a manner independent of the presentation of the media content program together with the one or more advertisements, advertisement content associated with the one or more advertisements for selective access by the user. The advertisement content may be provided to the user in any non-intrusive manner that allows the user to selectively access the advertisement content at a time and in a manner of the user's choosing. For example, the advertisement content may be transmitted to the user in the form of an email, text message, or other communication. Additionally or alternatively, the advertisement content may be provided within a portal (e.g., a web portal) accessible by the user. The user may accordingly access the advertisement content at any suitable time (e.g., after the media content program has been presented) and with any suitable access device (e.g., with a mobile device).

The methods and systems described herein may allow users who may be interested in advertisement content (e.g., coupons, promotions, interactive advertisements, etc.) geared toward (i.e., configured to target) an audience of a particular media content program to selectively receive, view, browse through, and/or otherwise experience the advertisement content in settings outside the context of watching or otherwise experiencing the media content program. In this manner, a user may still experience advertisement content associated with a particular media content program regardless of whether the user has watched the media content program and/or the advertisements presented in conjunction with (i.e., together with) the media content program.

The methods and systems described herein may also be advantageous to providers (e.g., broadcast television service providers and/or vendors) of advertisements presented in conjunction with a media content program. For example, vendors may be more likely to advertise during a particular media content program if they know that a certain number of users have subscribed to an advertisement service associated with the media content program. Moreover, the methods and systems described herein may provide advertisement providers with the ability to track how users interact with various types of advertisement content presented to the users, thereby enabling the advertisement providers to more effectively target and/or deliver advertisement content to those users.

As used herein, the term "media content program" refers to any television program, on-demand media program, pay-per-view media program, broadcast media program (e.g., broadcast television program), multicast media program (e.g., multicast television program), narrowcast media program (e.g., narrowcast video-on-demand program), IPTV media content, video, movie, audio content, or any segment, component, or combination of these or other forms of media content that may be processed by an access device for experiencing by a user. The term "advertisement content" refers to any type of advertisement content that may be associated with (e.g., related to) an advertisement presented together with a media content program (i.e., during one or more advertisement breaks associated with the media content program) and/or the media content program itself. For example, advertisement content may include, but is not limited to, a text-based advertisement (i.e., an advertisement that primarily includes text), an image-based advertisement (i.e., an advertisement that includes one or more images), a coupon, a selectable link, an interactive advertisement, one of the advertisements presented together with the media content program, and/or any other type of content as may serve a particular implementation. Specific instances of advertisement content will be referred to herein as "advertisement content instances."

FIG. 1 illustrates an exemplary non-intrusive advertisement presentation system 100 (or simply "system 100"). As shown, system 100 may include a subscription management facility 102, an advertisement content management facility 104, and a storage facility 106, which may be in communication with one another using any suitable communication technologies. It will be recognized that although facilities 102-106 are shown to be separate facilities in FIG. 1, any of facilities 102-106 may be combined into fewer facilities, such as into a single facility, or divided into more facilities as may serve a particular implementation.

Subscription management facility 102 may be configured to manage one or more subscriptions of one or more users to an advertisement service associated with one or more media content programs. For example, subscription management facility 102 may be configured to subscribe a user to an advertisement service associated with a media content program. This may be performed in any suitable manner. For example, subscription management facility 102 may receive user input provided by the user and representative of a request to subscribe to the advertisement service and, in response, subscribe the user to the advertisement service. As will be illustrated below, the user input may be received by way of a program guide graphical user interface ("GUI"), a companion application executed by a mobile device (e.g., a mobile phone and/or a tablet computer), and/or in any other manner as may serve a particular implementation.

Additionally or alternatively, subscription management facility 102 may automatically subscribe a user to an advertisement service in accordance with a user profile associated with the user. For example, a user profile associated with a user may include data representative of one or more viewing habits of the user and may indicate that the user regularly watches a particular media content program. Based on this information, subscription management facility 102 may automatically subscribe the user to an advertisement service associated with the particular media content program. It will be recognized that the user may selectively opt in or out of being automatically subscribed to media content programs based on his or her user profile.

Advertisement content management facility 104 may be configured to manage (e.g., select, provide, present, and/or otherwise process) advertisement content, which may be associated with one or more advertisements presented together with a media content program and/or the media content program itself. To illustrate, advertisement content management facility 104 may detect a presentation (e.g., a broadcast) of a media content program together with one or more advertisements associated with the media content program and provide advertisement content associated with the one or more advertisements and/or the media content program for selective access by the user.

Advertisement content management facility 104 may provide advertisement content for selective access by the user in any suitable manner. For example, advertisement content management facility 104 may provide the advertisement content in accordance with the advertisement service to which the user is subscribed. In other words, the advertisement content may be provided in accordance with one or more preferences associated with the advertisement service as specified by the user. To illustrate, the user may specify a manner in which the advertisement content is provided for selective access by the user (e.g., by email), specify that only particular types of advertisement content (e.g., coupons) are to be provided for selective access by the user, specify how often the advertisement content is to be provided to the user, and/or otherwise specify one or more preferences associated with the advertisement service.

Additionally or alternatively, advertisement content management facility 104 may provide the advertisement content in a manner independent of the presentation of the media content program together with the one or more advertisements. For example, the advertisement content may be provided by way of a delivery platform (e.g., a message delivery platform or network) that is independent of another delivery platform (e.g., a broadcast television delivery platform or network) used to present the media content program together with the one or more advertisements, at a different time than that of a presentation of the media content program and the one or more advertisements (e.g., after the media content program and the one or more advertisements are presented), by way of a different channel than the channel by which the media content program and the one or more advertisements are presented, and/or in any other manner that is independent of the presentation of the media content program and the one or more advertisements.

In some examples, advertisement content management facility 104 may provide advertisement content for selective access by a user by transmitting one or more messages (e.g., one or more emails and/or text messages) comprising the advertisement content (or links thereto) to the user. In this manner, the user may access the advertisement content in settings outside the context of watching or otherwise experiencing the media content program. For example, the user may be in a store for which an advertisement was presented in conjunction with a particular media content program. The user may access advertisement content (e.g., a coupon) associated with the advertisement on a mobile device (e.g., a mobile phone or a tablet computer) while located within the store and use the coupon to purchase a particular item from the store.

Additionally or alternatively, advertisement content management facility 104 may provide advertisement content for selective access by a user by providing the user with access to a portal that includes the advertisement content. The portal may be a web-based portal, for example, and may be accessed by the user when the user desires to access one or more advertisement content instances. An exemplary portal that may include advertisement content will be described in more detail below.

Advertisement content management facility 104 may be further configured to facilitate selective presentation to a user of only a subset of the advertisement content in response to one or more filter criteria specified by the user. For example, the advertisement content presented within a portal may initially include a plurality of advertisement content instances. Advertisement content management facility 104 may subsequently receive user input (e.g., by way of the portal) representative of a request to filter the advertisement content instances in accordance with one or more filter criteria. In response to the user input, advertisement content management facility 104 may present only those advertisement content instances that match the one or more filter criteria. For example, the user may specify that he or she only wants to view coupons that save the user twenty percent or more. In response, advertisement content management facility 104 may present only those advertisement content instances that include coupons that save the user twenty percent or more.

In some examples, a user may select a particular advertisement content instance presented thereto (e.g., in a message and/or a portal). In response, advertisement content management facility 104 may provide additional advertisement content associated with the particular advertisement content instance for selective access by the user. To illustrate, a user may select an advertisement content instance provided by a fast food restaurant. In response, advertisement content management facility 104 may provide one or more additional advertisement content instances provided by the fast food restaurant (e.g., one or more promotions, menu items, etc.).

In some examples, advertisement content management facility 104 may detect one or more attributes of an access device used by a user to selectively access advertisement content and automatically optimize a presentation format of the advertisement content in accordance with the one or more attributes of the access device. To illustrate, advertisement content management facility 104 may detect a bandwidth and/or display capability of a mobile phone used by a user to selectively access advertisement content and adjust a resolution of the advertisement content to best match the detected bandwidth and/or display capabilities of the mobile phone.

In some examples, a user may subscribe to an advertisement service associated with a particular media content channel (e.g., a media content channel that carries one or more media content programs that the user likes). In response, advertisement content management facility 104 may provide advertisement content associated with any or all of the advertisements and/or media content programs presented by way of the media content channel for selective access by the user.

Storage facility 106 may be configured to maintain subscription data 108 utilized and/or generated by subscription management facility 102, advertisement content data 110 utilized and/or generated by advertisement content management facility 104, and user profile data 112 representative of a user profile associated with one or more users. Storage facility 106 may be configured to maintain additional or alternative data as may serve a particular implementation.

Figure 2:
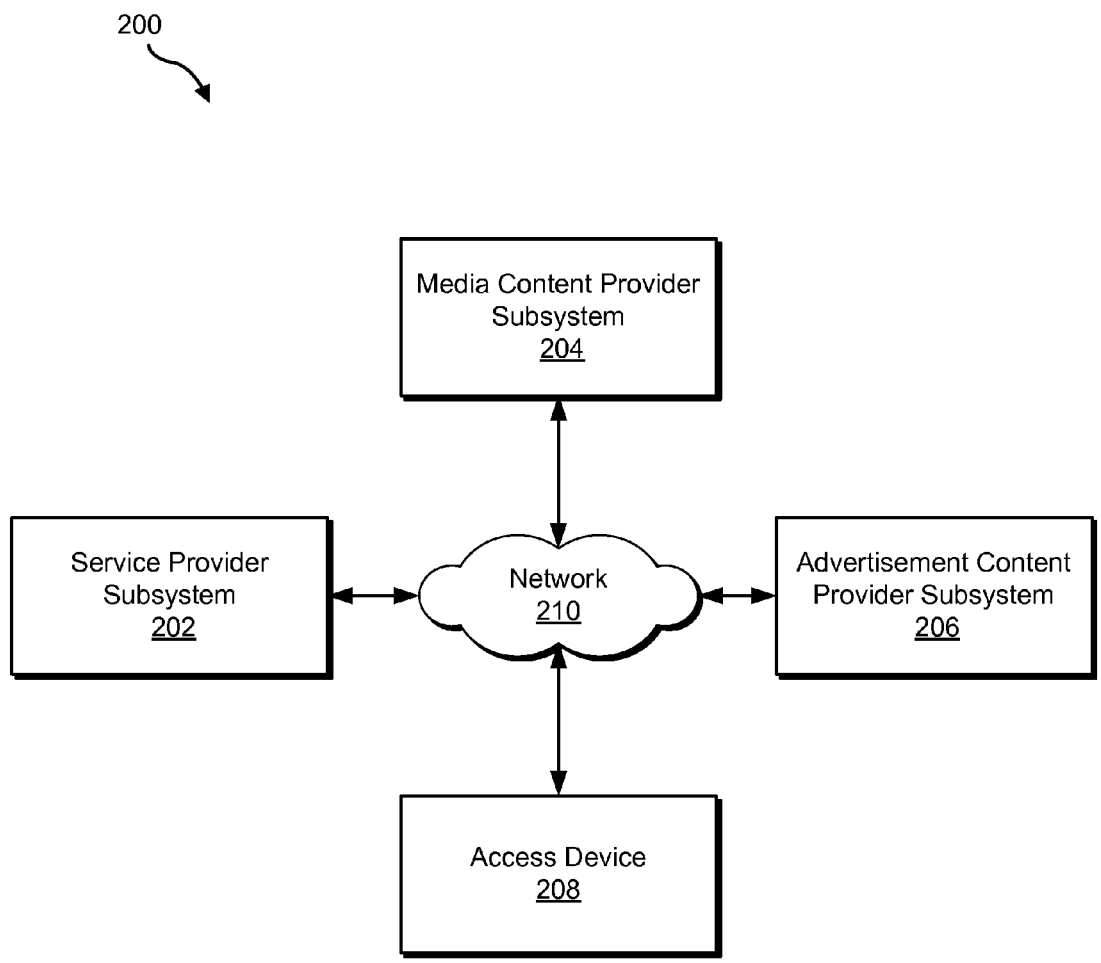
FIG. 2 illustrates an exemplary implementation of the system of FIG. 1 according to principles described herein.

FIG. 2 illustrates an exemplary implementation 200 of system 100 wherein a service provider subsystem 202, a media content provider subsystem 204, and an advertisement content provider subsystem 206 are communicatively coupled to an access device 208 by way of a network 210. As will be described in more detail below, subscription management facility 102, advertisement content management facility 104, and storage facility 106 may each be implemented by one or more of service provider subsystem 202, media content provider subsystem 204, advertisement content provider subsystem 206, and access device 208.

Service provider subsystem 202 may be associated with a service provider (e.g., a subscriber television service provider, an Internet service provider, etc.) and may be configured to provide one or more content services (e.g., television services, video-on-demand services, Internet services, etc.) to access device 208. For example, service provider subsystem 202 may be configured to manage (e.g., maintain, process, distribute, and/or generate) media content (e.g., media content programs, advertisements, etc.) configured to be presented to one or more users of access device 208.

Media content provider subsystem 204 may be associated with any suitable media content provider (e.g., ESPN, etc.) and may be configured to provide media content for presentation to one or more users of access device 208. In some examples, the media content may be provided to access device 208 by way of service provider subsystem 202.

Advertisement content provider subsystem 206 may be configured to provide advertisement content for selective access by a user of access device 208. For example, advertisement content provider subsystem 206 may be configured to transmit advertisement content to access device 208 in the form of one or more messages. In some alternative examples, advertisement content provider subsystem 206 may be included within service provider subsystem 202 and/or managed by the same service provider that controls service provider subsystem 202.

Access device 208 may be configured to facilitate access by a user to content (e.g., media content programs and/or advertisement content) provided by any of subsystems 202-206 and/or content stored locally by access device 208. Access device 208 may be implemented by any suitable access device, such as a set-top box device, a digital video recorder ("DVR") device, a personal computer, a mobile device (e.g., a mobile phone or a tablet computer), a personal-digital assistant device, a gaming device, a television device, and/or any other suitable computing device configured to access content.

Service provider subsystem 202, media content provider subsystem 204, advertisement content provider subsystem 206, and/or access device 208 may each be implemented by one or more computing devices. For example, service provider subsystem 202, media content provider subsystem 204, advertisement content provider subsystem 206, and/or access device 208 may be implemented by one or more server devices, access devices, and/or other computing devices.

Service provider subsystem 202, media content provider subsystem 204, advertisement content provider subsystem 206, and/or access device 208 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Service provider subsystem 202, media content provider subsystem 204, advertisement content provider subsystem 206, and/or access device 208 may communicate using any suitable network. For example, as shown in FIG. 2, service provider subsystem 202, media content provider subsystem 204, advertisement content provider subsystem 206, and/or access device 208 may be configured to communicate with each other by way of network 210. Network 210 may include one or more networks or types of networks capable of carrying communications and/or data signals between the components of system 100. For example, network 210 may include, but are not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In some examples, although FIG. 2 shows service provider subsystem 202, media content provider subsystem 204, advertisement content provider subsystem 206, and access device 208 communicatively coupled via network 210, it will be recognized that service provider subsystem 202, media content provider subsystem 204, advertisement content provider subsystem 206, and access device 208 may be configured to communicate one with another in any other suitable manner (e.g., via a direct connection).

In certain embodiments, system 100 may be implemented entirely by or within service provider subsystem 202, media content provider subsystem 204, advertisement content provider subsystem 206, or access device 208. For example, system 100 may be implemented entirely by service provider subsystem 202, by media content provider subsystem 204, by advertisement content provider subsystem 206, or by access device 208. In other embodiments, components of system 100 may be distributed across service provider subsystem 202, media content provider subsystem 204, advertisement content provider subsystem 206, and/or access device 208.

Figure 3:
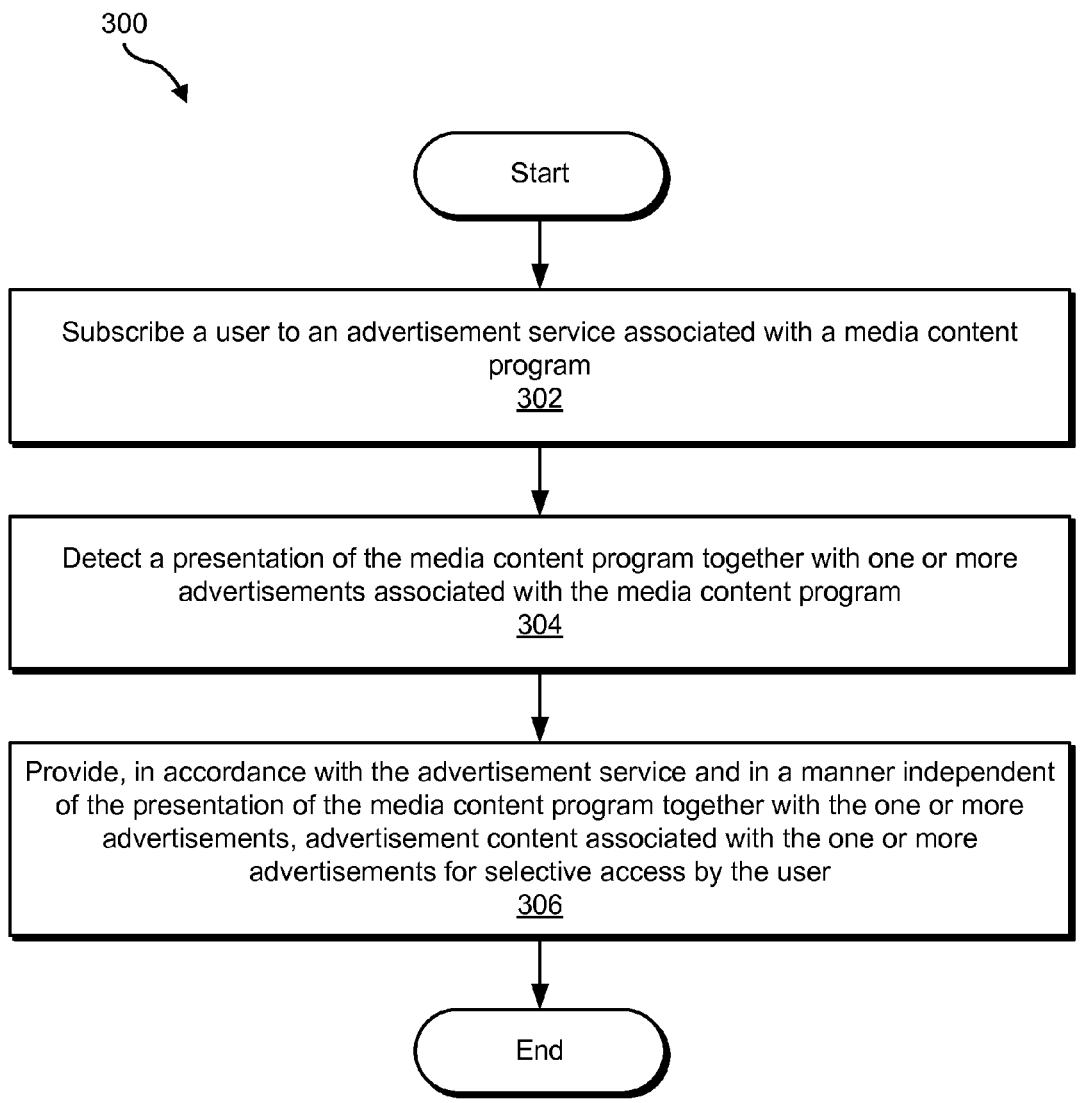
FIG. 3 illustrates an exemplary non-intrusive advertisement presentation method according to principles described herein.

FIG. 3 illustrates an exemplary non-intrusive advertisement presentation method 300 according to principles described herein. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100.

Figure 4:
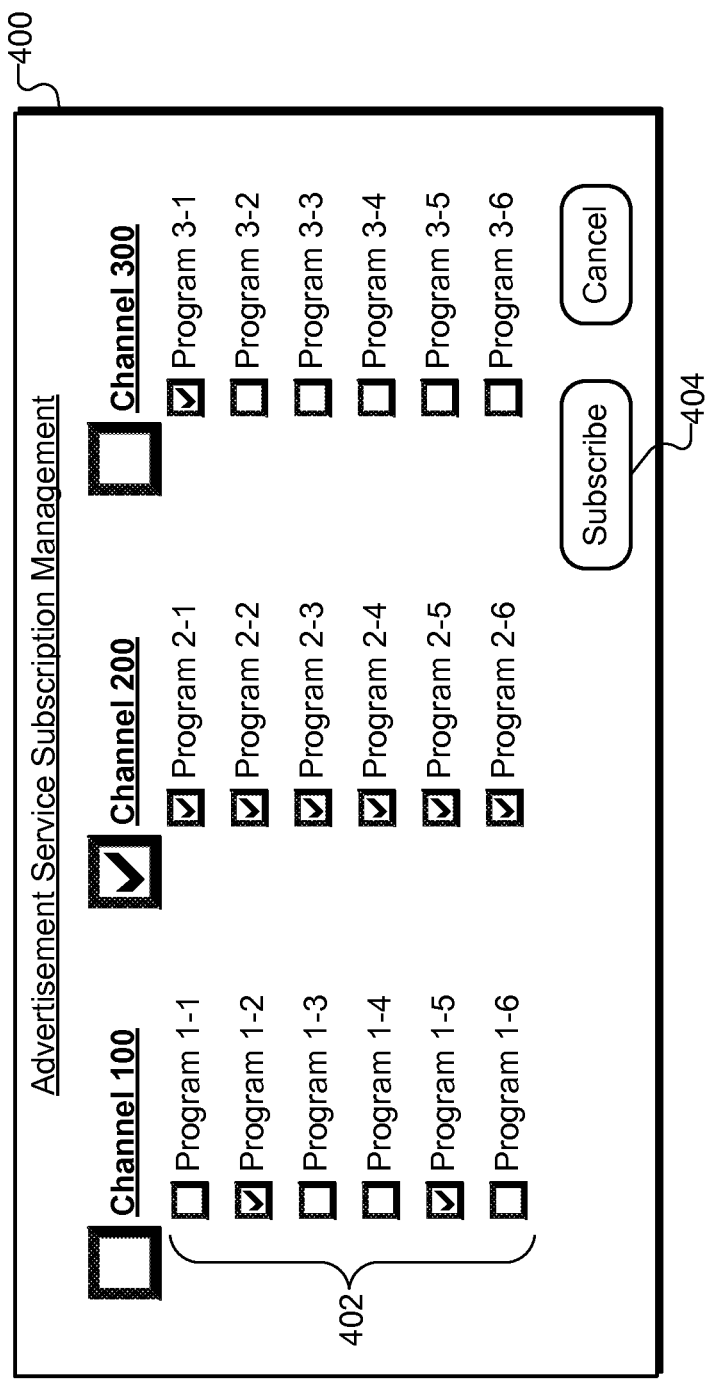
FIG. 4 illustrates an exemplary graphical user interface that may be used by a user to subscribe to an advertisement service associated with one or more media content programs and/or media content channels according to principles described herein.

In step 302, a user is subscribed to an advertisement service associated with a media content program. The user may be subscribed to the advertisement service in any suitable manner. For example, FIG. 4 illustrates an exemplary GUI 400 that may be presented by way of an access device to a user and that may be used by the user to subscribe to an advertisement service associated with one or more media content programs and/or media content channels. It will be recognized that GUI 400 may be presented by way of any suitable type of access device. For example, GUI 400 may be presented by way of the same access device (e.g., a set-top box device) that presents the media content programs. Alternatively, GUI 400 may be presented by way of an access device (e.g., a mobile device) that is separate from the access device (e.g., a set-top box device) that presents the media content programs. It will be recognized that GUI 400 is merely illustrative of the many different types of GUIs that may be configured to facilitate subscription by a user to an advertisement service associated with one or more media content programs and/or media content channels.

As shown, GUI 400 includes various listings (e.g., listing 402) of media content programs carried by various media content channels (e.g., media content channels "100," "200," and "300"). In some examples, a user may subscribe to an advertisement service associated with a particular media content program by marking a checkbox displayed next to a name of the particular media content program. Likewise, a user may subscribe to an advertisement service associated with a particular media content channel by marking a checkbox displayed next to a name of the particular media content channel. To illustrate, FIG. 4 shows that a user has subscribed to an advertisement service associated with media content programs named "program 1-2," "program 1-5," and "program 3-1." FIG. 4 also shows that the user has subscribed to an advertisement service associated with the media content channel "200." Hence, all of the media content programs associated with media content channel "200" are also shown as being selected. After selecting the desired media content programs and/or channels, the user may select a "subscribe" option 404 to direct system 100 to subscribe the user to an advertisement service associated with each of the selected media content programs and/or channels.

Figure 5:
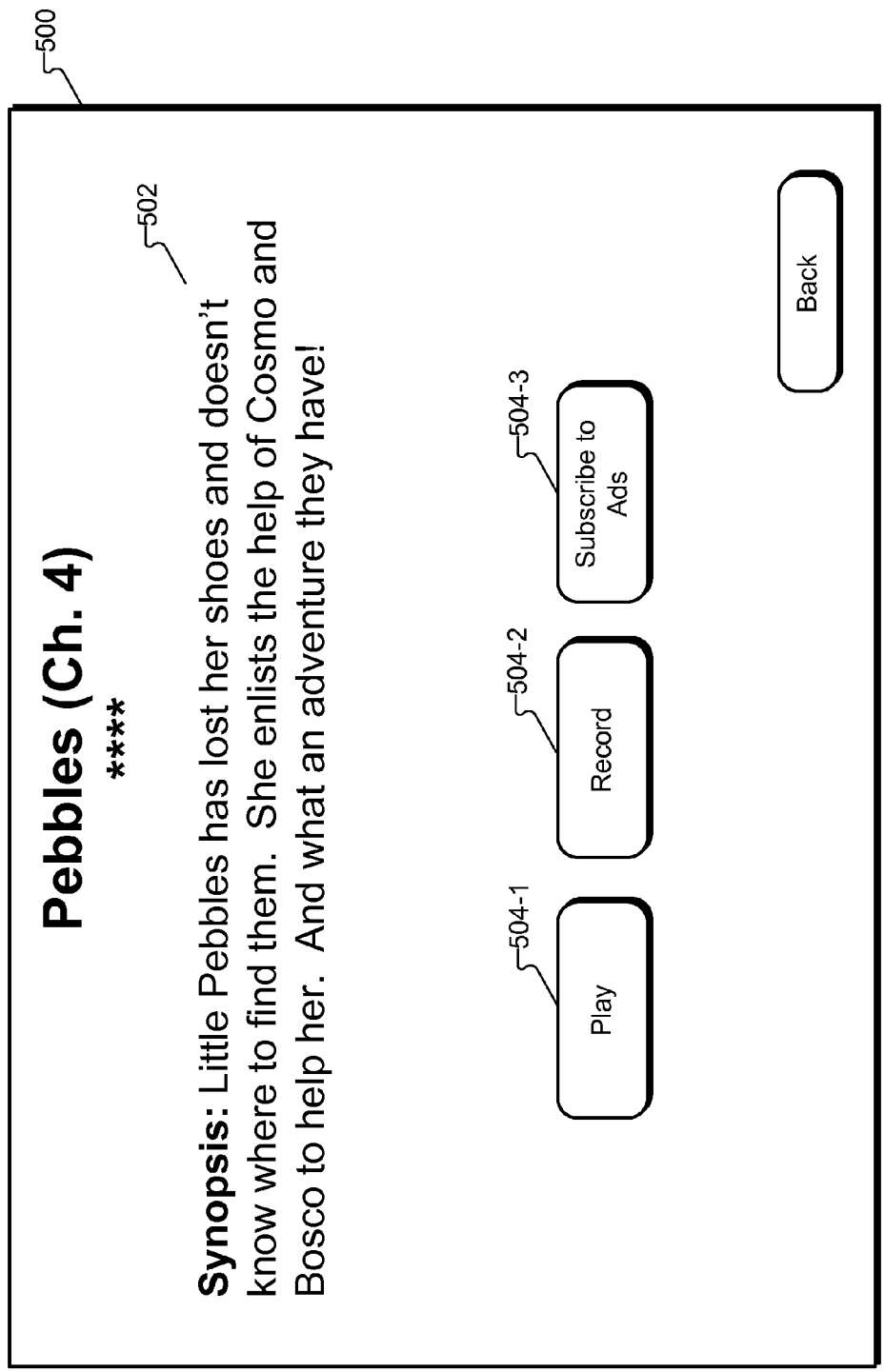
FIG. 5 illustrates another exemplary graphical user interface that may be used by a user to subscribe to an advertisement service associated with a particular media content program according to principles described herein.

FIG. 5 illustrates another exemplary GUI 500 that may be presented by way of an access device to a user and that may be used by the user to subscribe to an advertisement service associated with a particular media content program. As shown, GUI 500 may be configured to present program guide information (e.g., synopsis 502) and/or options 504 (e.g., options 504-1 through 504-3) associated with a particular media content program (e.g., a broadcast television program entitled "Pebbles"). As shown, one of options 504 (i.e., option 504-3) may be selected by a user to subscribe to an advertisement service associated with the media content program.

It will be recognized that a user may subscribe to an advertisement service associated with a media content program and/or a media content channel in any other suitable manner. For example, a user may transmit a subscription request message (e.g., an email message and/or text message) to a service provider or any other entity to subscribe to an advertisement service associated with a media content program and/or a media content channel. Additionally or alternatively, as discussed above, system 100 may automatically subscribe a user to an advertisement service associated with a media content program and/or a media content channel based on a user profile associated with the user.

In some examples, system 100 may receive a request to subscribe to an advertisement service associated with a media content program by way of an access device that is separate from the access device that presents the media content program. For example, a user may utilize a set-top box device to present a media content program together with one or more advertisements. However, the user may concurrently utilize a different access device (e.g., a mobile device) to provide a request to subscribe to an advertisement service associated with the media content program. Advertisement content may then be provided for access by the user by way of the set-top box device, the mobile device, and/or any other access device.

Returning to FIG. 3, in step 304, a presentation of the media content program together with one or more advertisements associated with the media content program is detected. System 100 may detect the presentation of the media content program together with one or more advertisements associated with the media content program in any suitable manner. For example, system 100 may detect that the media content program and the one or more advertisements have been distributed (e.g., broadcast, multicast, narrowcast), played back (e.g., using a DVR application), or otherwise presented. It will be recognized that an access device associated with the user does not necessarily have to actually present (e.g., be tuned to) the media content program and the one or more advertisements for the presentation of the media content program and the one or more advertisements to be detected by system 100.

In step 306, advertisement content associated with the one or more advertisements is provided for selective access by the user in accordance with the advertisement service and in a manner independent of the presentation of the media content program together with the one or more advertisements. The advertisement content may be provided in any suitable manner as may serve a particular implementation.

Figure 6:
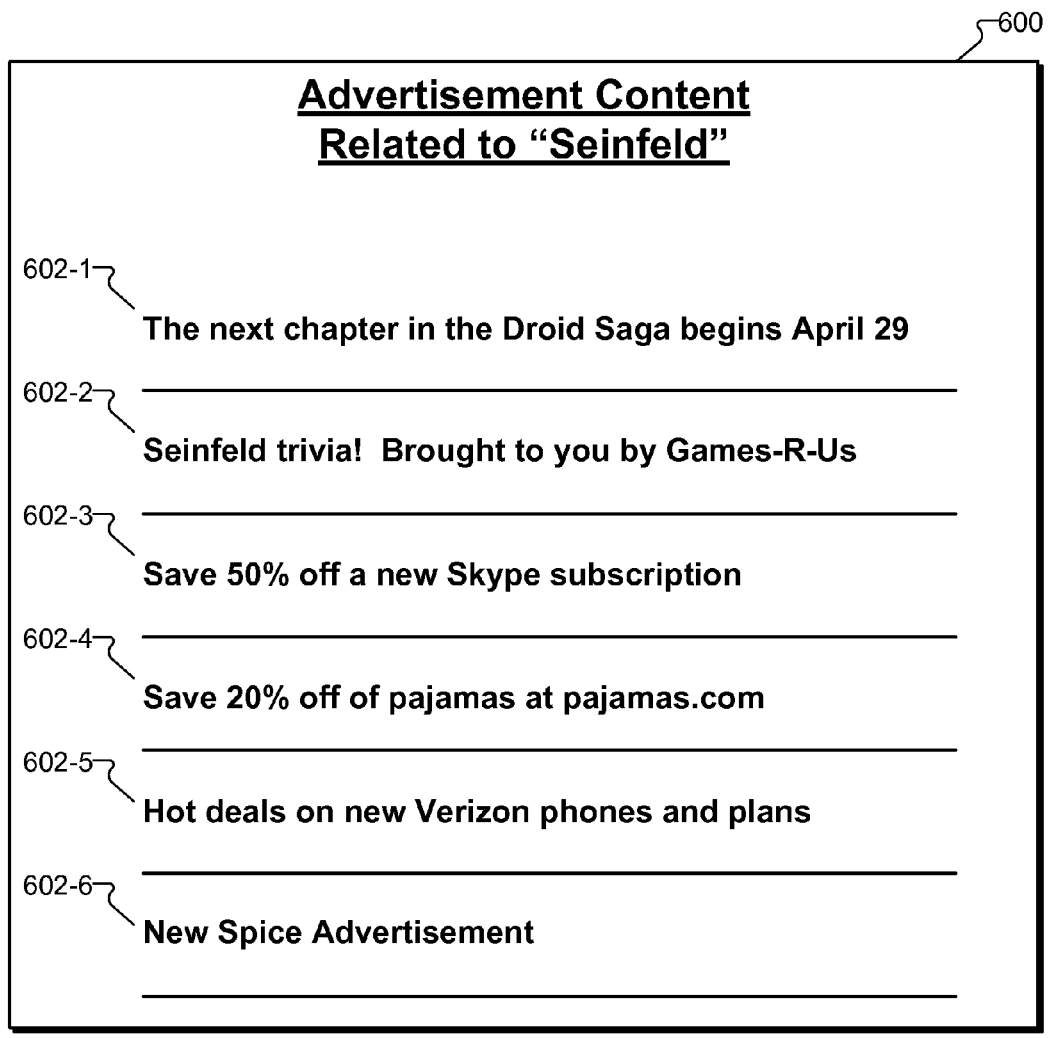
FIG. 6 shows the contents of an exemplary email that may be transmitted to a user after the user has subscribed to an advertisement service associated with a media content program according to principles described herein.

For example, as described above, the advertisement content may be transmitted in the form of a message (e.g., an email message or a text message) to the user. To illustrate, FIG. 6 shows the contents of an exemplary email message 600 that may be transmitted to a user after the user has subscribed to an advertisement service associated with a media content program entitled "Seinfeld." As shown, email message 600 may include a number of text-based advertisement content instances 602 (e.g., advertisement content instances 602-1 through 602-6). It will be recognized that any other type of advertisement content may be included in email message 600 as may serve a particular implementation. Because the advertisement content is included in an email message, the user may access any one of the advertisement content instances 602 using various types of access devices (e.g., a personal computer or a mobile device) in various settings (e.g., at home, at a store, or on the road).

Figure 7:
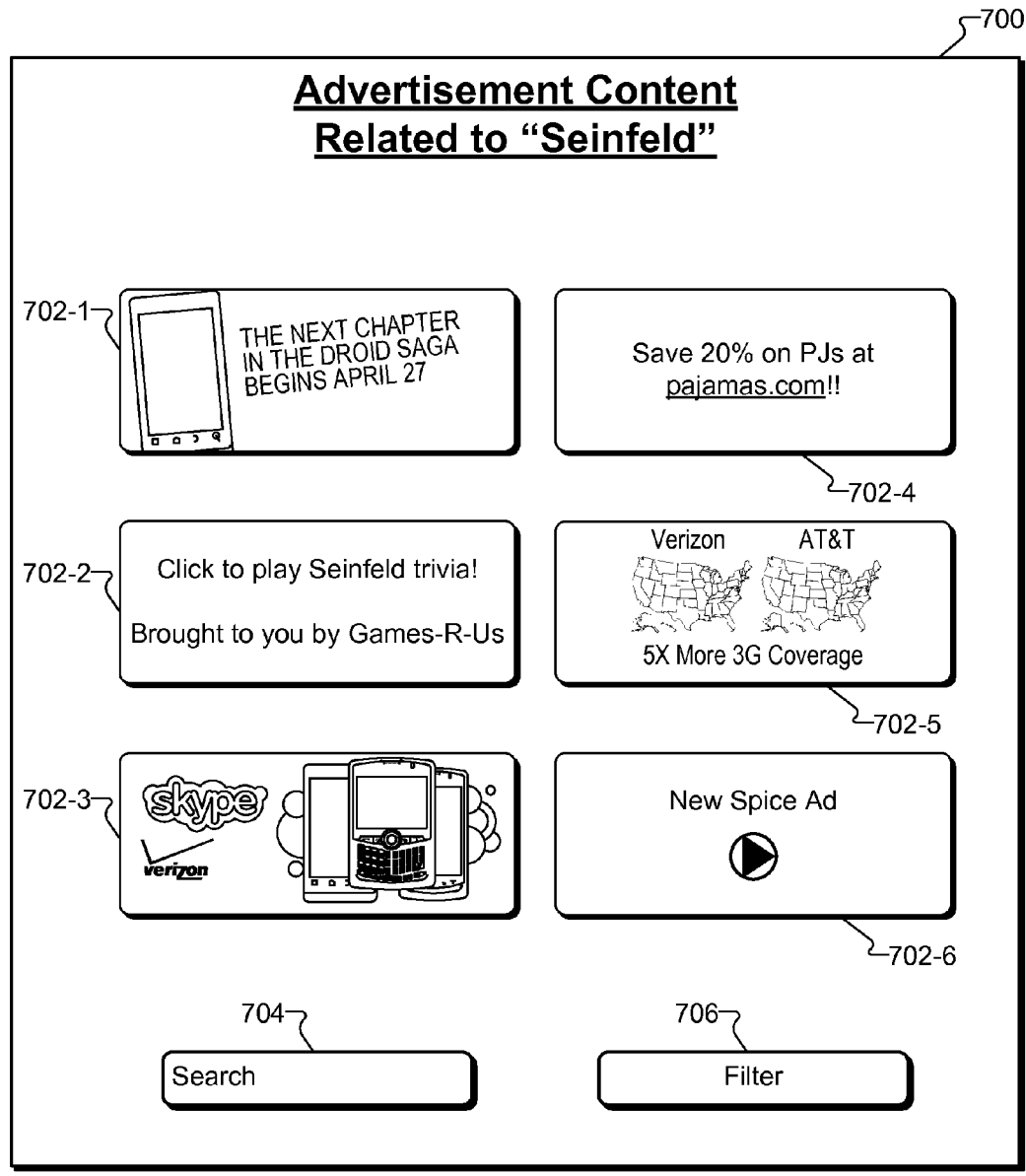
FIG. 7 illustrates an exemplary portal that may include a number of advertisement content instances according to principles described herein.

As also described above, the advertisement content may additionally or alternatively be provided to the user within a portal. FIG. 7 illustrates an exemplary portal 700 that may include a number of advertisement content instances 702 (e.g., advertisement content instances 702-1 through 702-6). As shown, advertisement content instances 702 may include a variety of types of advertisement content (e.g., text-based advertisements, image-based advertisements, interactive advertisements, coupons, videos, etc.). A particular advertisement content instance (e.g., advertisement content instance 702-1) may be selected in order to access additional advertisement content associated with the selected advertisement content instance. For example, a user may be presented with a coupon after he or she watches a particular advertisement content instance. In this manner, users may be incentivized to view and/or otherwise access advertisement content instances. It will be recognized that interaction by the user with advertisement content instances 702 may be tracked by a service provider or the like in order to more effectively target and/or deliver advertisement content to the user.

A user may search for one or more advertisement content instances by entering one or more search terms into search term input field 704. Additionally or alternatively, the user may specify one or more filter criteria by selecting a "filter" option 706. For example, the user may select "filter" option 706 to specify that he or she only wants to view coupons that save the user twenty percent or more. In response, system 100 may present only those advertisement content instances (e.g., advertisement content instance 702-4) that include coupons that save the user twenty percent or more. Portal 700 may additionally or alternatively include any other type of information and/or option related to the advertisement content as may serve a particular implementation.

Figure 8:
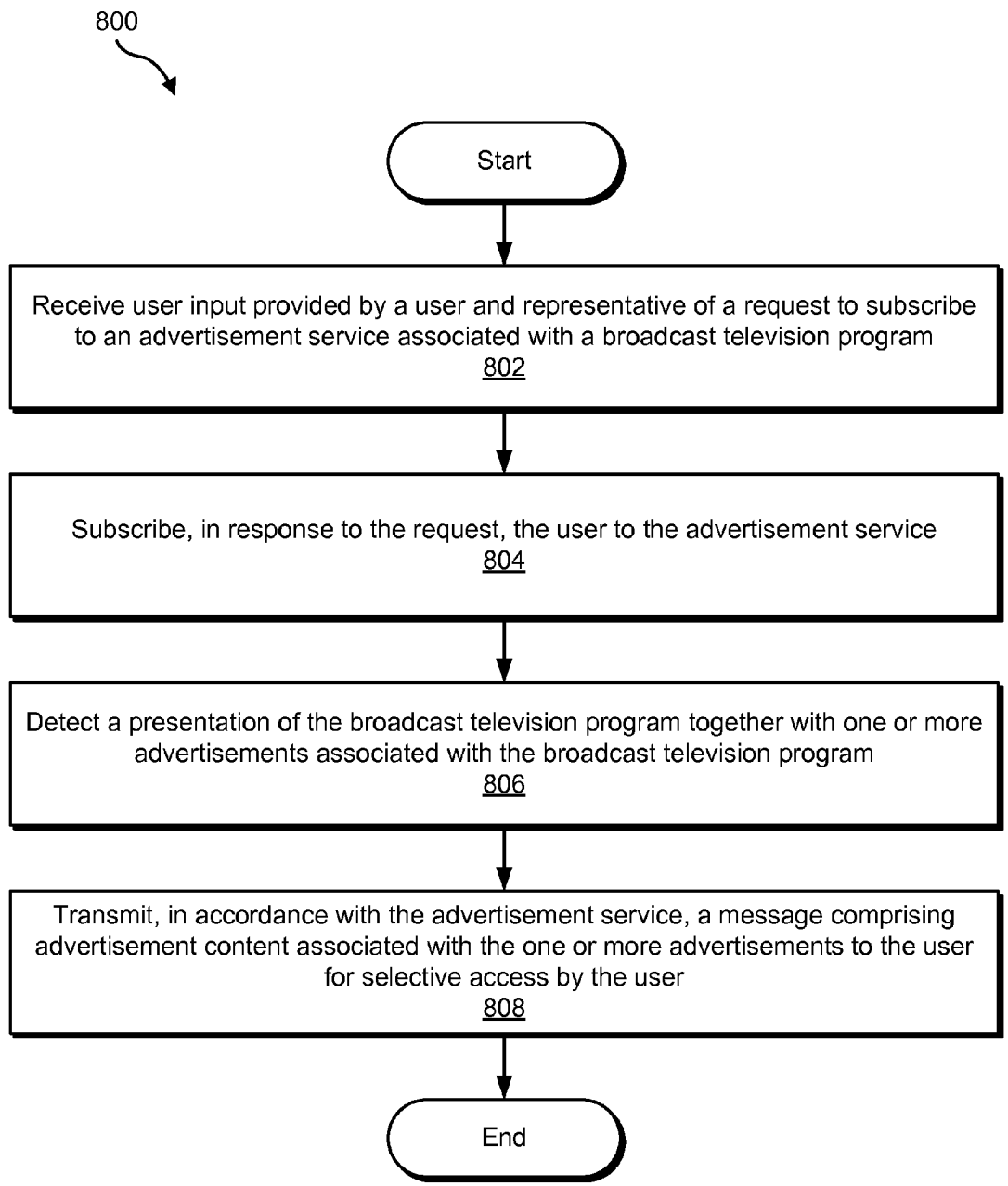
FIG. 8 illustrates another exemplary non-intrusive advertisement presentation method according to principles described herein.

FIG. 8 illustrates another exemplary non-intrusive advertisement presentation method 800 according to principles described herein. While FIG. 8 illustrates exemplary steps according to one embodiment, other embodiments may omit, add to, reorder, and/or modify any of the steps shown in FIG. 8. One or more of the steps shown in FIG. 8 may be performed by any component or combination of components of system 100.

In step 802, a non-intrusive advertisement presentation system receives user input provided by a user and representative of a request to subscribe to an advertisement service associated with a broadcast television program. Step 802 may be performed in any of the ways described herein.

In step 804, the non-intrusive advertisement presentation system subscribes the user to the advertisement service in response to the request. Step 804 may be performed in any of the ways described herein.

In step 806, the non-intrusive advertisement presentation system detects a presentation of the broadcast television program together with one or more advertisements associated with the broadcast television program. Step 806 may be performed in any of the ways described herein.

In step 808, the non-intrusive advertisement presentation system transmits, in accordance with the advertisement service, a message comprising advertisement content associated with the one or more advertisements to the user for selective access by the user. Step 808 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
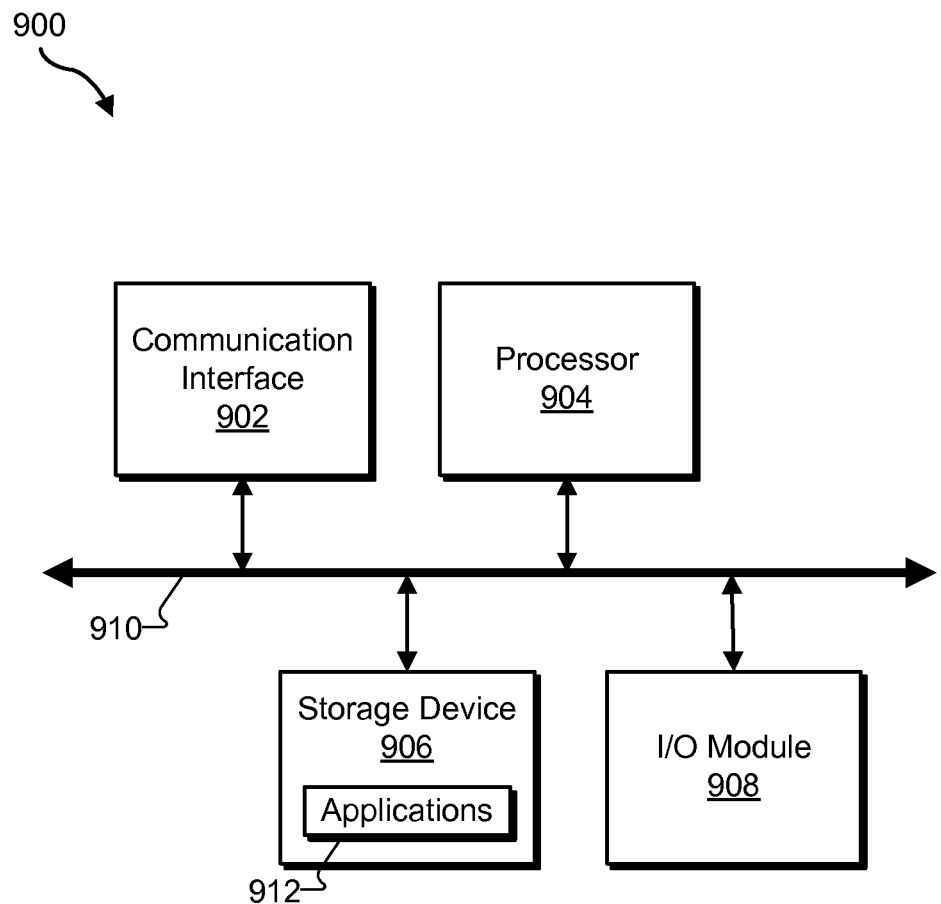
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with subscription management facility 102 and/or advertisement content management facility 104. Likewise, storage facility 106 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   providing, by a non-intrusive advertisement presentation system for presentation to a user, a graphical user interface configured to facilitate the user subscribing to an advertisement service, the graphical user interface including a plurality of user selectable options representative of a plurality of media content programs carried by a media content channel;
   receiving, by the non-intrusive advertisement presentation system by way of the graphical user interface, user input representative of a request to subscribe to the advertisement service, the user input comprising a user selection of a user selectable option included in the plurality of user selectable options and representative of a media content program included in the plurality of media content programs;
   subscribing, by the non-intrusive advertisement presentation system in response to the receiving of the user input, the user to an advertisement service associated with the media content program;
   detecting, by the non-intrusive advertisement presentation system, a presentation of the media content program and one or more advertisements associated with the media content program by a first access device; and
   delivering, by the non-intrusive advertisement presentation system in response to the detecting and in a delivery manner independent of the presentation of the media content program and the one or more advertisements, additional advertisement content to a second access device separate from the first access device for selective access by the user,
   wherein the additional advertisement content is associated with the one or more advertisements associated with the media content program.

2. The method of claim 1, wherein the graphical user interface is provided for presentation to the user by way of the second access device separate from the first access device.

3. The method of claim 1, wherein the subscribing is performed in accordance with a user profile associated with the user.

4. The method of claim 3, wherein the user profile comprises data representative of one or more viewing habits of the user.

5. The method of claim 1, wherein the delivering of the additional advertisement content in the delivery manner independent of the presentation of the media content program and the one or more advertisements for selective access by the user comprises delivering the additional advertisement content by way of a delivery platform that is independent of another delivery platform used to present the media content program and the one or more advertisements.

6. The method of claim 1, wherein the delivering of the additional advertisement content comprises transmitting one or more messages comprising the additional advertisement content to the second access device.

7. The method of claim 6, wherein the one or more messages comprise at least one of an email message and a text message.

8. The method of claim 1, wherein the delivering of the additional advertisement content comprises providing the user with access to a portal that includes the additional advertisement content.

9. The method of claim 8, wherein the additional advertisement content comprises a plurality of advertisement content instances, and wherein the method further comprises:

receiving, by the non-intrusive advertisement presentation system, user input representative of a request to filter the advertisement content instances in accordance with one or more filter criteria; and presenting, by the non-intrusive advertisement presentation system within the portal, only a subset of the advertisement content instances in response to the user input, wherein each advertisement content instance included in the subset of advertisement content instances matches the one or more filter criteria.

10. The method of claim 1, wherein the additional advertisement content comprises one or more advertisement content instances, and wherein the method further comprises:

detecting, by the non-intrusive advertisement presentation system, selection by a user of a particular advertisement content instance included in the one or more advertisement content instances; and delivering, by the non-intrusive advertisement presentation system in response to the selection, other additional advertisement content associated with the particular advertisement content instance for selective access by the user.

11. The method of claim 1, wherein the delivering further comprises delivering other additional advertising content associated with the media content program for selective access by the user.

12. The method of claim 1, further comprising:

detecting, by the non-intrusive advertisement presentation system, one or more attributes of the second access device used by the user to selectively access the additional advertisement content; and automatically optimizing, by the non-intrusive advertisement presentation system, a presentation format of the additional advertisement content in accordance with the one or more attributes of the second access device.

13. The method of claim 1, wherein the additional advertisement content comprises at least one of an advertisement included in the one or more advertisements associated with the media content program, a selectable link, an interactive advertisement, a text-based advertisement, an image-based advertisement, and a coupon.

14. The method of claim 1, wherein the advertisement service is further associated with the media content channel carrying the media content program, and wherein the method further comprises:

detecting, by the non-intrusive advertisement presentation system, a presentation of one or more other advertisements by way of the media content channel; and delivering, by the non-intrusive advertisement presentation system in a manner independent of the presentation of the one or more other advertisements, other advertisement content associated with the one or more other advertisements for selective access by the user.

15. The method of claim 14, wherein the one or more other advertisements are presented during one or more advertisement breaks associated with the media content program.

16. The method of claim 1, wherein the media content program comprises a broadcast television program.

17. The method of claim 1, embodied as computer-executable instructions on at least one non-transitory computer-readable medium.

18. The method of claim 1, wherein the providing of the additional advertisement content further comprises providing the additional advertisement content in accordance with one or more preferences specified by the user.

19. The method of claim 1, wherein the additional advertisement content is configured to be selectively accessed, from the second access device, by the user at any time after the presentation of the media content program and the one or more advertisements associated with the media content program.

20. The method of claim 1, wherein the graphical user interface further includes a plurality of selectable options representative of a plurality of media content channels, the plurality of media content channels including the media content channel carrying the media content program;

the user input further comprises a user selection of a selectable option representative of a media content channel included in the plurality of media content channels; and the subscribing further comprises subscribing the user to an advertisement service associated with the media content channel.

21. A method comprising:

providing, by a non-intrusive advertisement presentation system for presentation to a user, a graphical user interface configured to facilitate the user subscribing to an advertisement service, the graphical user interface including a plurality of user selectable options representative of a plurality of broadcast television programs carried by a media content channel;

receiving, by the non-intrusive advertisement presentation system, user input provided by the user and representative of a request to subscribe to the advertisement service, the user input comprising a user selection of a user selectable option included in the plurality of user selectable options and representative of a broadcast television program included in the plurality of broadcast television programs;

subscribing, by the non-intrusive advertisement presentation system in response to the request, the user to an advertisement service associated with the broadcast television program;

detecting, by the non-intrusive advertisement presentation system, a presentation of the broadcast television program together with one or more advertisements associated with the broadcast television program by a first access device; and delivering, by the non-intrusive advertisement presentation system in response to the detecting, a message comprising additional advertisement content associated with the one or more advertisements to a second access device separate from the first access device for selective access by the user.

22. The method of claim 21, embodied as computer-executable instructions on at least one non-transitory computer-readable medium.

23. A system comprising:

a subscription management facility that provides, for presentation to a user, a graphical user interface configured to facilitate the user subscribing to an advertisement service, the graphical user interface including a plurality of user selectable options representative of a plurality of media content programs carried by a media content channel;

receives, by way of the graphical user interface, user input representative of a request to subscribe to the advertisement service, the user input comprising a user selection of a user selectable option included in the plurality of user selectable options and representative of a media content program included in the plurality of media content programs;

subscribes, in response to the request, the user to an advertisement service associated with the media content program; and an advertisement content management facility communicatively coupled to the subscription management facility and that detects a presentation of the media content program together with one or more advertisements associated with the media content program by a first access device, and delivers, in a manner independent of the presentation of the media content program together with the one or more advertisements, additional advertisement content to a second access device separate from the first access device for selective access by the user, wherein the additional advertisement content is associated with the one or more advertisements associated with the media content program.

* * * * *